Sept. 1, 1970  J. SCHEIBEL  3,526,818

SLIDE PROJECTOR CONTROL ARRANGEMENT

Filed July 10, 1967  2 Sheets-Sheet 2

Inventor

United States Patent Office 3,526,818
Patented Sept. 1, 1970

3,526,818
SLIDE PROJECTOR CONTROL ARRANGEMENT
Josef Scheibel, Ober-Moerlen, Germany, assignor to Braun Aktiengesellschaft, Frankfurt am Main, Germany
Filed July 10, 1967, Ser. No. 652,086
Claims priority, application Germany, July 8, 1966, B 87,917
Int. Cl. H02p 1/22
U.S. Cl. 318—266         11 Claims

ABSTRACT OF THE DISCLOSURE

An electrical control arrangement for controlling the direction of motion of a slide changing mechanism in a slide projector. A direct-current motor operable in forward and reverse directions is coupled to the slide changing mechanism. A selector switch permits the preselection of the direction of motion of the motor and hence the slide changing mechanism. A push-button is provided for initiating the slide changing process or operation. Limit switches actuated by a cam surface on the slide changing mechanism bridge the push-button and maintain the circuit to the motor closed until the slide changing process has been completed. The arrangement includes provision for initiating the slide changing process from a remote location.

BACKGROUND OF THE INVENTION

In conventional slide changing mechanisms, changing of slides is accomplished through a continuously operating motor which also drives the blower of the projector. An electromagnetic coupling permits the slide changing mechanism to be intermittently connected to the motor for the purpose of transferring the slide from the magazine on the slide platform and vice versa.

For the purpose of selecting either forward or reverse motions of the slide changing mechanism, complex electromagnetic means are provided, in the conventional apparatus, for remotely operating the mechanism. The electromagnetic controlling means must be reset after each slide changing step has been completed. Accordingly, considerably complex equipment from the viewpoint of cost and quantity is required to perform the desired slide changing operation.

Accordingly, it is an object of the present invention to provide for a motor-driven arrangement whereby the slide changing operation is accomplished by controlling the motion and direction of the motor through means that are simple and economical when compared to conventional apparatus.

The object of the invention is achieved through a direct-current motor which is operated only when the slide changing process takes place, and which may be operated in one or another direction depending upon the actuation of a switch. A simple rectifying circuit is provided with two branches whereby the switch connects the motor to one or another branch depending on the direction of motion desired.

The present invention also includes a push-button connected to the switch which selects the direction of the motor operation. It is the purpose of the push-button to initiate the operation of the motor in the direction selected. Thus, after the switch has connected the motor to the proper rectifying branch depending upon the direction of motor rotation desired, the depression of the push-button closes the circuit to the motor whereby the latter may operate in the desired manner.

It is possible to include both the switch for selecting the direction of rotation of the motor, and the push-button in one control unit. In one design of such a control unit, it is possible to provide that by depressing a manual means the switch for selecting the rotational motion of the motor be actuated. Upon further depression of this manual means beyond a predetermined level, the push-button may be designed to be closed.

The present invention includes limit switches which open the control circuit to the motor, after actuation of the push-button, when a slide changing operation has been completed or a projected slide has been deposited in its corresponding magazine compartment to permit release of the magazine. These limit switches are operated by cam surfaces on the slide changing mechanism.

It is of advantage to connect the limit switches across the push-button so that when once they are actuated by the cam surfaces on the slide changing mechanism, the push-button may be released. The cam surfaces are arranged to maintain the limit switches closed until a slide changing operation or process has been fully completed or the slide changing mechanism has been released as aforementioned.

The present invention provides, furthermore, only one single control means either at the projector or at a remote location for the purpose of advancing the slide changing mechanism. Such a simple slide changing operating procedure is especially desirable from the viewpoint of the projectionist. In this particular design, a single relay may be applied to operate in conjunction with a single push-button for the purpose of connecting the D.C. motor to the proper branch of the rectifying circuitry. The relay serves for maintaining the motion of the slide changing mechanism in the desired direction after actuation of the push-button. The opening of the motor circuit is achieved also in this arrangement by means of a cam-operated limit switch which becomes opened when the projected slide has been transferred to its corresponding compartment and the slide changing mechanism is thereby released, or a slide changing process has been completed.

It is noted that even with the design which includes the above-described relay, the present invention provides for a simpler combination than that available in conventional controlling arrangements. Thus, the present invention includes fewer elements and components even though the relay is used. This arises from the condition that the conventional designs must necessarily also include a relay for the purpose of controlling the action of the electromagnetic coupling which intermittently connects the continuously operating motor with the slide changing mechanism. The present invention is considerably simplified since it is not necessary to include such mechanical parts as the electromagnetic coupling and the associated linkages thereof.

It is a further advantage in the present invention to provide that the direct-current motor driving the slide changing mechanism, be provided with permanent excitation. Such permanent excitation may be connected to the low voltage supply of the projection lamp in the projector, for the purpose of assuring a simplified arrangement requiring a minimum amount of space.

SUMMARY OF THE INVENTION

A control arrangement for operating a slide changing mechanism in a projector. A direct-current motor is operatively coupled to the slide changing mechanism and drives the latter in either forward or reverse directions as desired. A rectifying circuit is provided so that the power supply for the direct-current motor may be in the form of an alternating-current source. The rectifying circuit has two branches operating in conjunction with a switch which selects the direction of rotation of the motor. When the switch connects to one branch of the rectifying circuit, the motor is operated in one direction, whereas when the switch is connected to the other branch of the rectifying circuit, the motor is operated or driven in the reverse direction. A push-button is provided which allows the entire slide changing operation to take place after the direction of motor rotation has been selected. Limit switches operated by the slide changing mechanism are connected in parallel with the push-button and maintain the circuit to the motor closed after the push-button is released. This circuit closure to the motor is maintained until the slide changing operation has been completed or a slide has been placed into its corresponding compartment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
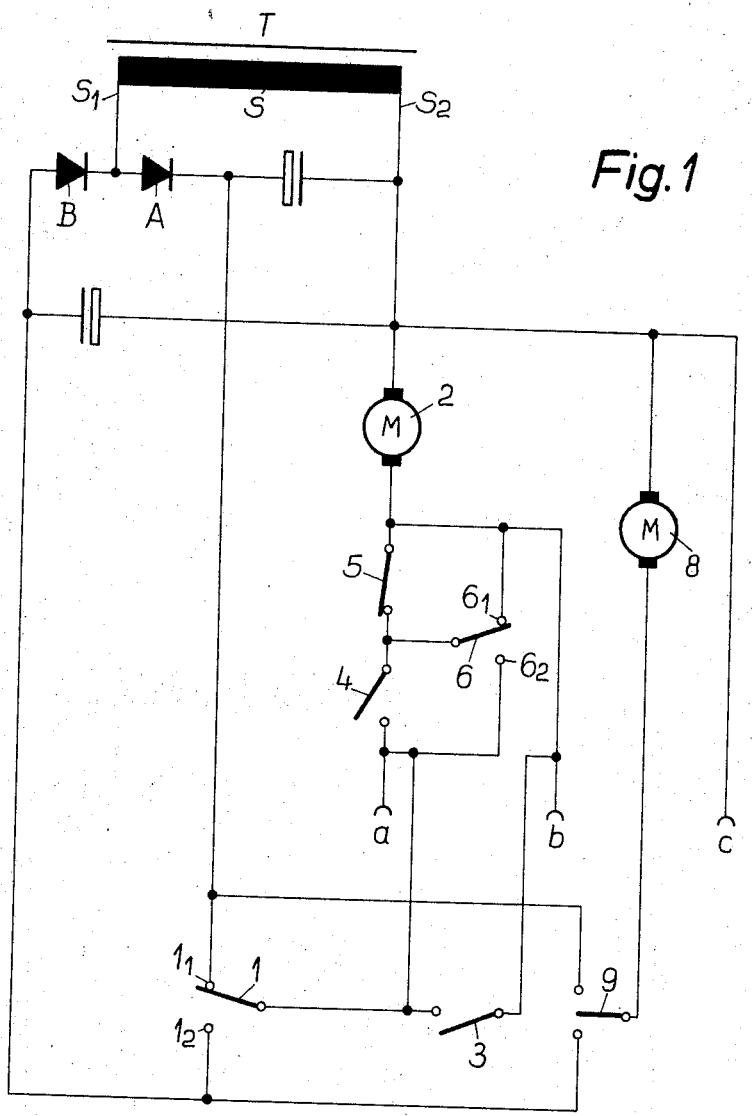
FIG. 1 is an electrical schematic diagram and shows the switching circuitry which connects the motor to one of two branches of a rectifying circuit for driving the motor in a preselected direction.

Referring to the drawing, and in particular to FIG. 1, the direction of motion for the slide changing magazine or cartridge is determined by the position of the switch 1. The latter controls the direction of rotation of a D.C. motor 2. The direct current power for the motor is obtained by rectifying the alternating current supply from a secondary winding S of a transformer T. The rectifying elements are diodes A and B. The closing of the circuit to the motor occurs through a push-button 3 connected in series with the switch 1. When the motor is operating the push-button 3 becomes bridged by one of two cam-operated switches.

Thus, when the slide changing process is begun, the limit switch 4 becomes closed as a result of a cam surface (not shown) on the slide changing mechanism. The switch 4 becomes opened again after a complete slide change has taken place in the form of transferring the slide that has been projected from the slide platform into the magazine compartment, advancing the magazine by one step or one compartment in the direction determined by the position of switch 1, and placing the next slide upon the platform.

The limit switch 5 also becomes closed, upon initiation of the slide changing process, by a second cam surface. This limit switch becomes reopened when the projected slide has been returned to its magazine compartment and the changing mechanism has been released.

The transfer of the changing mechanism from the state in which it is performing a full changing operation to the state in which the magazine is released, occurs through the switch 6. When the switch 6 is in the position $6_1$ the limit switch 4 is connected in the motor circuit. When, on the other hand, switch 6 is in the position $6_2$, the limit switch 5 is in the motor circuit.

When the switch 1 is in the position $1_1$, the following circuit arrangement prevails upon depression of the push-button 3:

A closed circuit is established through the elements including terminal $S_1$ of the secondary winding S of transformer T, rectifier A, switching contact $1_1$ of the switch 1, push-button 3, the coil of the D.C. motor 2, and the terminal $S_2$ of the secondary winding S.

The D.C. motor 2 thereby rotates in the preselected direction and the limit switches 4 and 5 become closed through actuation by the associated cam surfaces of the changing mechanism. When the push-button 3 is subsequently opened a closed circuit prevails through the following elements:

Transformer terminal $S_1$, rectifier A, switching contact $1_1$ of the switch 1, limit switch 4 and switching contact $6_1$ of the switch 6 for full slide transfer or contact $6_2$ and limit switch 5 for magazine release, motor coil 2, and terminal $S_2$ of the transformer.

The motor circuit is opened again, as already indicated, through limit switch 4 upon completion of a slide transfer or through limit switch 5 upon the release of the magazine.

For the return of the magazine, the switch 1 is placed in the position $1_2$. When the push-button 3 is then depressed, a circuit is established through the following elements:

Terminal $S_2$, motor winding 2, push-button 3, switching contact $1_2$ of the switch 1, rectifier B, and terminal $S_1$.

The D.C. motor 2 lies now within the circuit of the rectifier B and thus rotates in the opposite direction. As a result, the limit switches 4 or 5 are closed and connect to the motor circuit by the release of the push-button 3 until a full slide change has taken place or the slide magazine is released.

The functional operation of the arrangement may be advantageously extended by connecting a second D.C. motor 8 in parallel to the driving motor 2, through the actuation of a switch 9. Through the action of the latter, this motor may be operated in two opposite directions for the purpose of positioning a projection lens system.

Connected terminals $a$, $b$ and $c$ are provided in the arrangement for the purpose of connecting a control for apparatus thereto. Terminals $a$ and $c$ can serve as the power supply for the control apparatus, whereas the terminals $a$ and $b$ allow a pulse generator to be connected across the push-button 3. The push-button 3 can then be used to correct or manipulate the circuit states initiated by the control pulses. Through auxiliary actuation of the switch 1, one or more slides can be re-referred to and projected for a desired period of time.

The switch 1 and push-button 3 as well as the switch 9 can be connected to the slide projector by means of a flexible cable. In this manner, the changing mechanism of the projector may be controlled remotely as desired.

Figure 2:
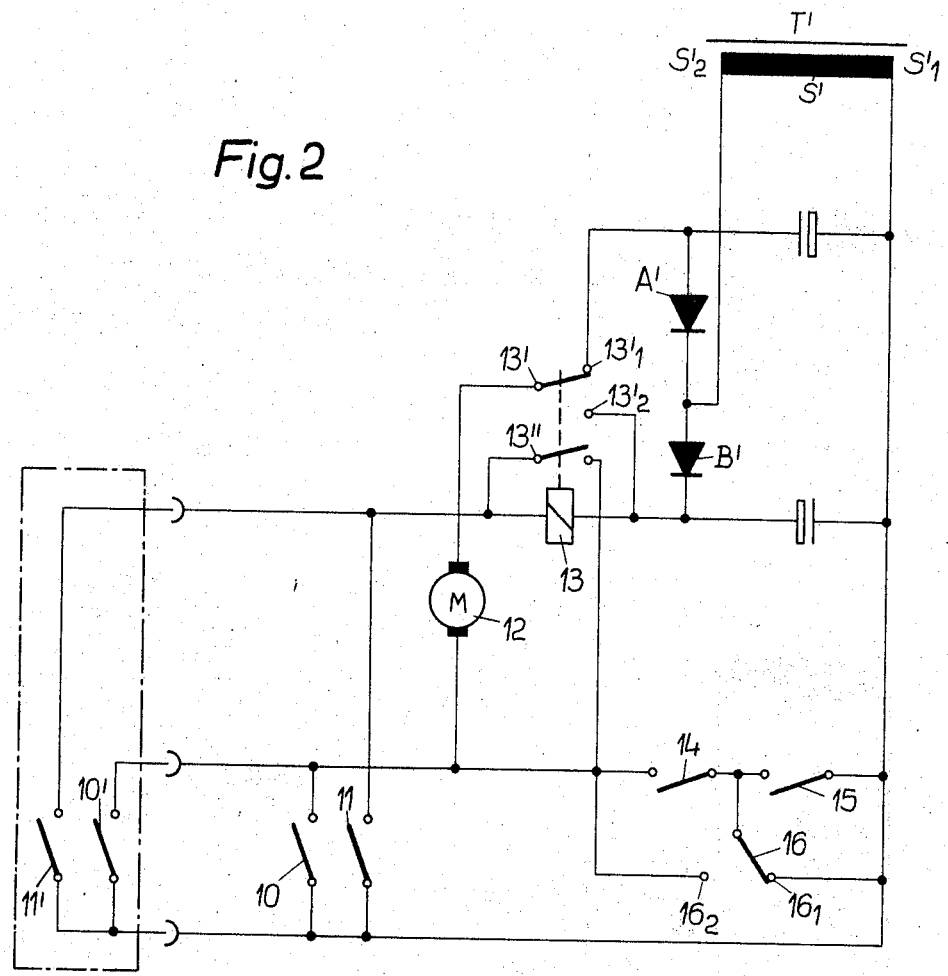
FIG. 2 is an electrical schematic diagram of another embodiment of the switching and control arrangement of FIG. 1.

FIG. 2 shows the switching arrangement of a relay controlled slide changer, in which the slide changing process in conjunction with the desired magazine direction is accomplished through the push-buttons 10 and 11 mounted on the projector. Push-buttons 10' and 11' are provided in parallel with switches 10 and 11, respectively, to permit remote control of the control arrangement. Upon depression of the push-button 10 on the projector or the push-button 10' for remote control, a circuit is established through the following elements or components:

Terminal $S_1$ of the secondary winding S' of the transformer P', push-button 10 or 10', winding of the D.C. motor 12, relay actuated switching 13' and $13'_1$, rectifier A', terminal $S'_2$ of the secondary winding S'.

When connected in the circuit of rectifier A', the D.C. motor 12 operates the slide magazine in the forward direction. Limit switches 14 and 15 bridge thereby the push-button 10 or 10', respectively, by being cam-actuated as described with reference to the embodiment of FIG. 1. The switch 14 closes the motor circuit until the slide change has been completed, whereas the switch 15 maintains the motor circuit closed until the position where the magazine is released has been attained. The limit switches 14 and 15 are connected into the motor circuit through the manually actuated switch 16. Thus, when the switch 16 is in the position 16₁ the limit switch 14 is in the circuit, whereas the limit switch 15 is connected in the circuit when the switch 16 is in the position 16₂.

If the push-button 11 or 11' is depressed, and the reversal of the magazine in the slide changing process is initiated, a circuit prevails through the following components: terminal S'₂, rectifier B, relay coil 13, push-button 11 or 11', and terminal S'₁.

The relay 13 is thereby energized and closes the switching contact 13''. At the same time, the switching contact 13' is brought into the position 13'₂. As a result, the motor circuit is established through the rectifier B', and a circuit flows through the following components:

Terminal S'₂, rectifier B', relay-actuated contact 13'–13'₂, winding of D.C. motor 12, relay switching contact 13'', push-button 11 or 11', and terminal S'₁.

As a result the D.C. motor 12 is now in the circuit of rectifier B' and rotates in the reverse direction. The changing process for the slides is thereby also initiated in the reverse direction. The push-button 11 or 11' becomes bridged by the limit switches 14 and 15 as described above. The relay 13 remains energized through its own contact 13'' until the motor circuit is opened through the limit switches 14 or 15.

The precedingly-described relay makes it possible to control the slide changing arrangement from either a remote location or by being stationed at the slide changer itself. In conjunction with this design, three main connections must be provided for connecting the apparatus for remote control purposes. The connector terminals provided at the projector for permitting remote control thereof, may also be arranged so that instead of a remote control unit, a slide changing control device may be connected thereto.

It is also quite possible with the above control arrangement to provide for a second driving motor for the purpose of accomplishing the focusing of the projector in a remotely controlled fashion, through a remote control device. This second driving motor may be energized and operated through the rectifiers A' and B' of the slide changing mechanism.

It is also feasible within the framework of the present invention, to provide a transistor circuit or similar semiconducting circuitry in place of the relay for the purpose of switching the motor circuit.

Finally, the present invention is not limited to a slide projector having a magazine with compartments. The present invention is also quite applicable to projectors which may be operated selectively in either the forward or reverse directions in conjunction with slide stacks.

It will be understood that each of the elements described above, or two or more together, may also find a useful application in other types of slide changers in projectors differing from the types described above.

While the invention has been illustrated and described as embodied in slide changers in projectors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A control arrangement for operating a slide changing mechanism in a projector comprising, in combination, a direct-current motor rotatable in forward and reverse directions and operatively coupled to said slide changing mechanism for driving the same in forward direction, on one hand, and reverse direction, on the other hand, as desired, said direct-current motor being reversible through reversal of current flow through said motor; a single-phase alternating-current power source; a first rectifying means connected to one terminal of said alternating-current power source for converting the alternating current thereof into direct current with current flow in the direction for operating said motor in the forward direction when said first rectifying means is connected between said alternating-current source and said motor; a second rectifying means connected to said one terminal of said alternating-current power source for converting the alternating current thereof into direct current with current flow in the direction for operating said motor in the reverse direction when said second rectifying means is connected between said alternating-current source and said motor, said first and second rectifying means being connected in series and the junction of said first and second rectifying means being connected to said one terminal of said alternating-current source so that positive portions of the alternating signal from said source are transmitted only by one of said rectifying means and negative portions of said signal are transmitted only by the other one of said rectifying means; and manually actuated selective switching means for connecting, on one hand, said motor to said first rectifying means, and connecting, on the other hand, said motor to said second rectifying means, whereby said motor drives said slide changing mechanism in the forward direction when connected to said first rectifying means, said motor driving said slide changing mechanism in the reverse direction when connected to said second rectifying means.

2. The control arrangement as defined in claim 1 wherein said switching means includes further relay means operating in conjunction with push-button means for driving said motor in the desired direction.

3. The control arrangement as defined in claim 1 wherein said switching means includes a switching member having first and second states of operation, said motor being connected to said first rectifying means when said switching member is in said first state and said motor being connected to said second rectifying means when said switching member is in said second state; and push-button means connected in series with said switching member for operating said motor when said push-button means is actuated.

4. The control arrangement as defined in claim 3 including limit switching means connected to said push-button means, said limit switching means being connected in parallel with said push-button means and being actuated to closed circuit position by said slide changing mechanism at the beginning of a slide changing process after actuation of said push-button means, said limit switching means being opened when said slide changing process is terminated.

5. The control arrangement as defined in claim 2 wherein said relay means has two switching contacts for operating said motor in the desired preselected direction.

6. The control arrangement as defined in claim 4 including manually operated selecting switching means for selectively connecting said limit switching means operatively to said motor.

7. The control arrangement as defined in claim 1 including a lens positioning direct current motor for positioning the lenses of said projector to focus the same; and an operating switch connected to said lens positioning direct current motor and to said first and second rectifying means, whereby said lens positioning direct current motor is operated, on one hand, in one direction when connected to said first rectifying means, and, on the other hand, in a second opposite direction when connected to said second rectifying means by said operating switching means.

8. The control arrangement as defined in claim 3 including remote controlled switching means connected in parallel with said push-button means for operating said motor from a remote location.

9. The control arrangement as defined in claim 1 wherein said first and second rectifying means are diodes.

10. The control arrangement as defined in claim 1 wherein said alternating current power source comprises the secondary winding of an alternating current transformer.

11. The control arrangement as defined in claim 1 wherein said direct-current motor driving the slide changing mechanism is provided with permanent excitation.

References Cited
UNITED STATES PATENTS

| | | | |
|---|---|---|---|
| 2,176,817 | 10/1939 | Jacobson et al. | 318—446 |
| 2,695,382 | 11/1954 | Wheatley et al. | 318—468 |
| 3,026,790 | 3/1962 | Arvan | 318—446 |
| 3,119,956 | 1/1964 | Cibelius et al. | 318—468 |
| 3,355,643 | 11/1967 | Benson | 318—293 |

ORIS L. RADER, Primary Examiner

K. L. CROSSON, Assistant Examiner

U.S. Cl. X.R.

318—293, 466